(12) United States Patent
Katsuyama

(10) Patent No.: US 10,807,610 B1
(45) Date of Patent: Oct. 20, 2020

(54) IN-VEHICLE SYSTEMS AND METHODS FOR INTERSECTION GUIDANCE

(71) Applicant: ALPINE ELECTRONICS, INC., Tokyo (JP)

(72) Inventor: Yoshihiro Katsuyama, Iwaki (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/520,070

(22) Filed: Jul. 23, 2019

(51) Int. Cl.
  *B60Q 1/00* (2006.01)
  *B60W 50/14* (2020.01)
  *G08G 1/09* (2006.01)
  *G08G 1/0967* (2006.01)

(52) U.S. Cl.
  CPC ............. *B60W 50/14* (2013.01); *G08G 1/091* (2013.01); *G08G 1/096783* (2013.01); *B60W 2050/146* (2013.01)

(58) Field of Classification Search
  CPC ........... B60W 50/14; B60W 2050/146; G08G 1/091; G08G 1/096783
  See application file for complete search history.

(56) References Cited

U.S. PATENT DOCUMENTS

| | | | | |
|---|---|---|---|---|
| 10,008,113 | B2 * | 6/2018 | Ova | G08G 1/096716 |
| 10,083,607 | B2 * | 9/2018 | Ginsberg | G08G 1/081 |
| 10,186,149 | B2 * | 1/2019 | Fujii | G08G 1/0967 |
| 2017/0124868 | A1 * | 5/2017 | Bhat | G08G 1/09623 |

FOREIGN PATENT DOCUMENTS

| | | |
|---|---|---|
| JP | 2005-345225 A | 12/2005 |
| JP | 2017-073026 A | 4/2017 |

\* cited by examiner

*Primary Examiner* — Phung Nguyen
(74) *Attorney, Agent, or Firm* — Knobbe, Martens, Olson & Bear, LLP

(57) ABSTRACT

Systems and methods that reduce stress and errors experienced by a vehicle's driver navigating an intersection are disclosed. An in-vehicle system is capable of communicating whether travel is permitted in different directions exiting the intersection to the driver. The system can include a traffic-information-collection interface configured to receive real-time traffic signal status information at signalized intersections along a roadway of vehicle travel and a display configured to display traffic information comprising a visual indicator for all directions of travel from signalized intersections. Each of the visual direction indicators indicates whether travel is allowed in the direction of travel associated with each visual direction indicator.

20 Claims, 4 Drawing Sheets

US 10,807,610 B1

IN-VEHICLE SYSTEMS AND METHODS FOR INTERSECTION GUIDANCE

FIELD

This disclosure relates to in-vehicle navigation systems and methods for intersection guidance.

BACKGROUND

Real-time traffic signal status information at signalized intersections can be centrally managed and can be made available through infrastructure communication. The information can be obtained, for example, through optical beacons or cloud-based networking and displayed on a road map of a navigation system. When the vehicle approaches a signalized intersection, certain navigation systems display a simple traffic signal icon, as shown in FIG. 2, at the signalized intersection.

SUMMARY

In certain circumstances, the traffic signal status of a signalized intersection changes at different times for different directions of travel. For example, the traffic signal status can be different for a straight advance, a left turn, and a right turn. In such case, a single traffic signal icon cannot fully describe the situation, and the driver may make a turn without knowing the current traffic signal status.

The embodiments disclosed herein include in-vehicle systems that provide an enhancement of the in-vehicle navigation system.

The in-vehicle navigation system and the guidance method assist a driver of a vehicle to identify real-time traffic signal status information at signalized intersections along a roadway of vehicle travel and provide traffic sign information for non-signalized intersections. Some embodiments disclosed herein reduce the driver's stress and errors at intersections.

In some embodiments, an in-vehicle system capable of communicating traffic information to a driver of a vehicle includes a traffic-information-collection interface configured to receive real-time traffic signal status information at signalized intersections along a roadway of vehicle travel from one or more sources. The one or more sources can include, but are not limited to, an external source, a memory device within the system, and an onboard image-capturing device. The real-time traffic signal status information from the external source can be obtained through a near-field communication system or via a network. The traffic-information-collection interface can also be configured to receive information for non-signalized intersections from the memory device within the system and the onboard image-capturing device.

The memory device can store map information and machine-readable instructions that cause an electronic processor to identify a roadway of vehicle travel correlated with the geospatial location of the vehicle obtained from a satellite-linked positioning system using the map information. The instructions identify each signalized intersection along the roadway of vehicle travel, process the real-time traffic signal status information for a traffic signal at each signalized intersection, and determine whether travel is permitted for all directions of travel from each signalized intersection.

The system can include a display interface, and the machine readable instructions stored in the memory device cause an electronic processor to generate a display of traffic information comprising a visual indicator for each direction of travel from each signalized intersection, wherein each of the visual direction indicators indicates whether travel is allowed in the direction of travel associated with each visual direction indicator.

The visual direction indicator can include an arrow indicating the direction of travel and directions for which travel is allowed are displayed distinguishably from other arrows that indicate directions for which travel is not allowed. The direction indicators can be distinguished, for example, by color differences or by flashing. Each of the visual direction indicators that comprises an arrow can be displayed in association with traffic lanes, and one or more of the visual direction indicators may indicate multiple directions.

At non-signalized intersections, the machine-readable instructions stored in the memory device can cause the system to generate a display of traffic information comprising a visual sign indicator for a non-signalized intersection in a vicinity of the vehicle. The traffic information comprising the visual sign indicator for non-signalized intersections can be obtained from an image-capturing device connected to the vehicle. The visual sign indicator is indicative of traffic signs along the roadway of vehicle travel. The system may indicate one or more directions of travel with the visual sign indicator or use the visual sign indicator with a visual direction indicator as described above.

The machine-readable instructions stored in the memory device further cause an electronic processor to update the display of traffic information when the traffic-information-collection interface receives changed real-time traffic signal status information, such that each of the visual direction indicators provides the driver with an accurate and real-time indication of whether travel is allowed in the direction of travel associated with the visual direction indicator.

The objectives of at least some disclosed embodiments can be achieved with one or more of the following methods using an in-vehicle system comprising a traffic-information-collection interface, a vehicle location interface, a navigation display interface, a memory device, and an electronic processor.

In some embodiments, a vehicle location interface receives a geospatial location of the vehicle from a satellite-linked positioning system, and the in-vehicle system identifies a roadway of vehicle travel correlated with the geospatial location of the vehicle obtained from a geospatial location of the vehicle from a satellite-linked positioning system using the stored map information and the navigation display interface sends vehicle navigation information to a display.

As the traffic-information-collection interface real-time traffic signal status information at signalized intersections along a roadway of vehicle travel from one or more sources. The in-vehicle system identifies the signalized intersections by correlating with the map information. Information for non-signalized intersections can be received from the memory device and/or the on-board image-capturing device.

The in-vehicle system processes the real-time traffic signal status information for a traffic signal at a signalized intersection and determines whether travel is permitted, for all directions of travel, from the signalized intersection. The in-vehicle system then generates a display of traffic information comprising a visual direction indicator for each direction of travel from the signalized intersection.

The in-vehicle system updates the display of traffic information when the traffic-information-collection interface receives changed real-time traffic signal status information, such that each of the visual direction indicators provides the driver with an accurate and real-time indication of whether travel is allowed in the direction of travel associated with the visual direction indicator.

One or more of the foregoing objectives and advantages can be realized with at least some of the embodiments described herein. In the description, reference is made to the accompanying drawings, which form a part of the description, and in which are shown by way of illustration specific embodiments. These embodiments will be described in sufficient detail to enable those skilled in the art to practice the claimed subject matter, and it is to be understood that other embodiments may be utilized, and structural modifications may be made, without departing from the scope of the invention.

BRIEF DESCRIPTION OF THE DRAWINGS

Certain embodiments will now be described with reference to the following drawings. Throughout the drawings, reference numbers may be re-used to indicate correspondence between referenced elements. The drawings are provided to illustrate example embodiments described herein and are not intended to limit the scope of the disclosure or the claims.

DETAILED DESCRIPTION

Hereafter, certain example systems and methods will be described in detail by reference to embodiments shown in the accompanying drawings. Unless defined otherwise, all technical and scientific terms used herein have the same meaning as is commonly understood by one skill in the art. In the following detailed description, numerous specific details are set forth in order to set forth how a person having ordinary skill in the art could make and use the disclosed subject matter. One having ordinary skill in the art would understand that the disclosed embodiments can include additional features, alternative features, or omitted features compared to what is described herein. In some instances, well-known methods, procedures, components, and mechanism have not been described in detail.

Figure 1:
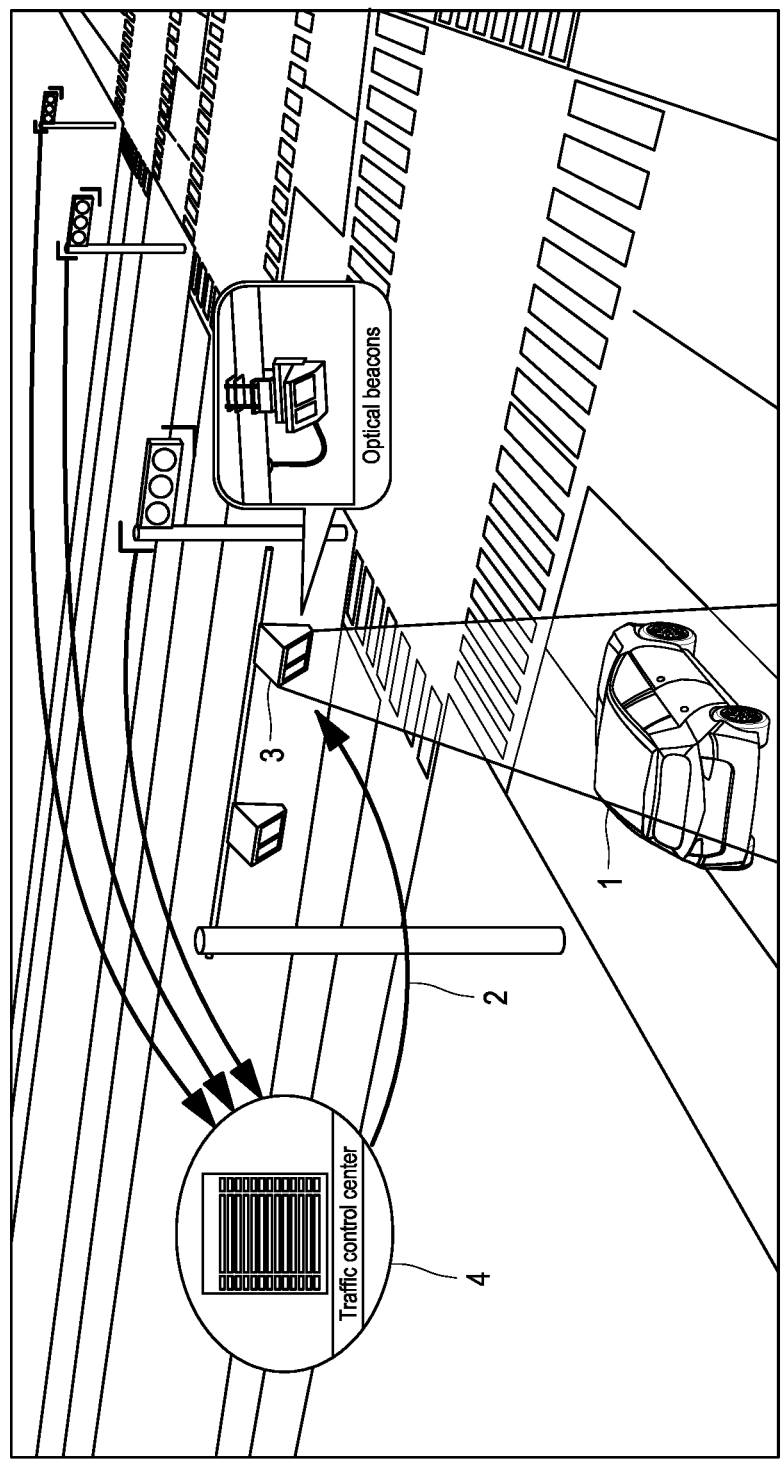
FIG. 1 illustrates a flow of real-time traffic signal status information at signalized intersections.

FIG. 1 illustrates a vehicle 1 comprising an in-vehicle system 10 configured to receive real-time traffic signal status information 2 via a signal status communications interface 3, which can include, for example, optical beacons. The signal status communications interface 3 can be positioned in the vicinity of a roadway of vehicle travel. As illustrated, the traffic signals can be centrally managed, and the real-time traffic signal status information 2 for the signalized intersections along the roadway of vehicle travel can be communicated to the in-vehicle system 10 via an infrastructure-to-vehicle communications interface 3.

Traffic signals are signaling devices positioned at intersections to control traffic flow. The traffic signals alternate the right of way by illuminating lamps or LEDs of different colors (e.g., red, yellow, and green). In some cases, the traffic signals may have arrow signals as well. As user herein, "traffic signals" refer to the lamps or the LEDs and arrow signals applicable to the vehicle 1 comprising the in-vehicle system at each of the signalized intersections along the roadway of vehicle travel, unless otherwise stated.

Figure 2:
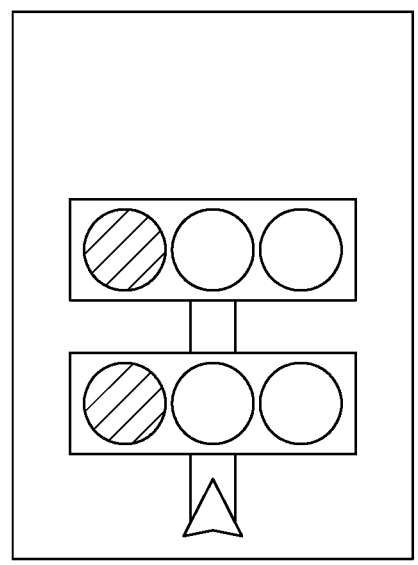
FIG. 2 shows a navigation interface with traffic signal icons.

FIG. 2 shows a display comprising conventional simple traffic signal icons. It is commonly known that a green signal allows traffic to proceed, a yellow signal warns that the traffic signal is about to change to red, and a red signal prohibits any traffic from proceeding. However, in some instances, traffic may turn right after stopping at a red signal, provided a vehicle gives way to pedestrians and other vehicles, and/or an additional arrow signal for turning left is provided. Thus, the simple traffic signal icon shown in FIG. 2 does not fully describe whether travel is allowed for each direction of travel exiting the intersection. Some embodiments provide additional guidance information that more fully communicates to a driver the current traffic signal status and availability of travel in different directions through the intersection.

Figure 3:
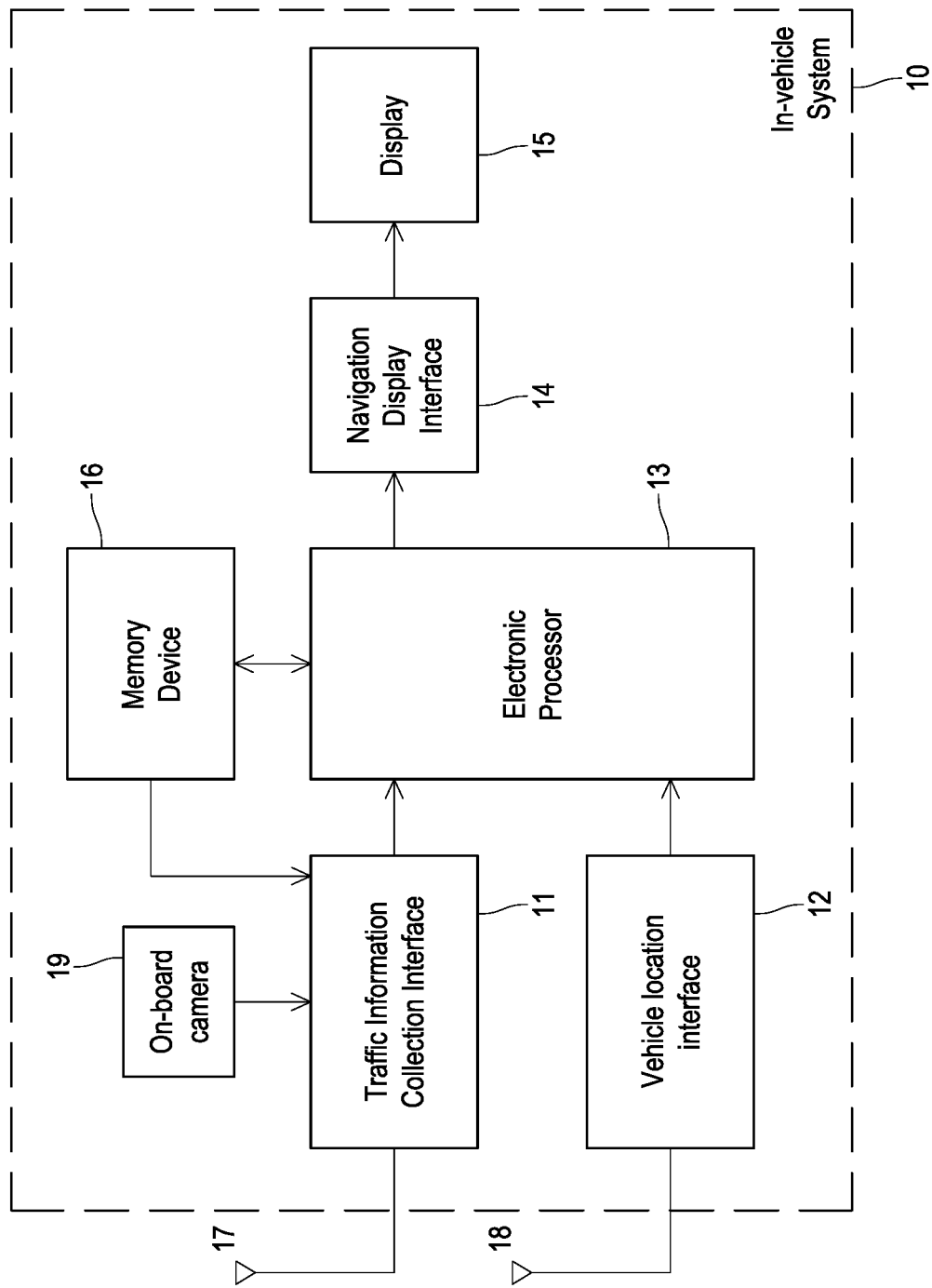
FIG. 3 shows a block diagram of an in-vehicle navigation system.

Referring to FIG. 3, the illustrated in-vehicle system 10 comprises a traffic-information-collection interface 11, a vehicle location interface 12, a navigation display interface 14, a display 15, an electronic processor 13, and a memory device 16.

The traffic-information-collection interface 11 is configured to receive real-time traffic signal status information 2 for signalized intersections along a roadway of vehicle travel. In some embodiments, the traffic-information-collection interface 11 includes an infrastructure-to-vehicle receiver 17 (such as, for example, an infrared beacon receiver) to receive the real-time traffic signal status information 2 from the roadside traffic signal controller or from the traffic center 4. Although it is not shown in the drawings, the information can be obtained by a network interface via, for example, cloud-based networking, or through other wireless data signal transmission techniques. The traffic-information-collection interface 11 comprises an input port to obtain the real-time traffic signal status information 2.

The vehicle location interface 12, which is configured to receive a geospatial location of the vehicle 1 from a satellite-linked positioning system, may comprise an antenna 18, a geolocation receiver (such as, for example, a Global Positioning System (GPS) receiver), a geo-positioning sensor and/or a slope-detecting sensor such as an accelerometer and/or a gyroscope.

The navigation display interface 14 is configured to send vehicle navigation information to a display 15 viewable by the driver. The electronic processor 13 writes to the memory device 16 and provides output information for the display via the navigation display interface 14, or the navigation display interface 14 may comprise memory, and the electronic processor 13 can write to the memory within the navigation display interface 14.

The memory device 16 stores map information and instructions executable by an electronic processor 13. Information for signalized intersections may be stored in the memory device 16, which includes traffic lane information such as a number of the lanes and assignment of directions. The memory device 16 can comprise RAM, ROM, hard drive, solid-state memory, another device capable of storing digital data, or a combination of such devices.

When the instructions are executed by an electronic processor 13, the instructions cause the in-vehicle system 10 to identify a roadway of vehicle travel correlated with the geospatial location of the vehicle 1 using the map information stored in the memory device 16. The in-vehicle system 10 identifies a signalized intersection along the roadway of vehicle travel, processes the real-time traffic signal status information 2 for a traffic signal at the signalized intersection, and determines whether travel is permitted for all directions of travel from the signalized intersection.

The in-vehicle system 10 generates a display of traffic information comprising a visual direction indicator 5 for each direction of travel from the signalized intersection, wherein each of the visual direction indicators 5 indicates whether travel is allowed in the direction of travel associated with each visual direction indicator 5 and updates the display of traffic information when the traffic-information-collection interface receives changed real-time traffic signal status information 2. Each of the visual direction indicators 5 provides the driver with an accurate and real-time indication of whether travel is allowed in the direction of travel associated with the visual direction indicator 5.

Figure 4:
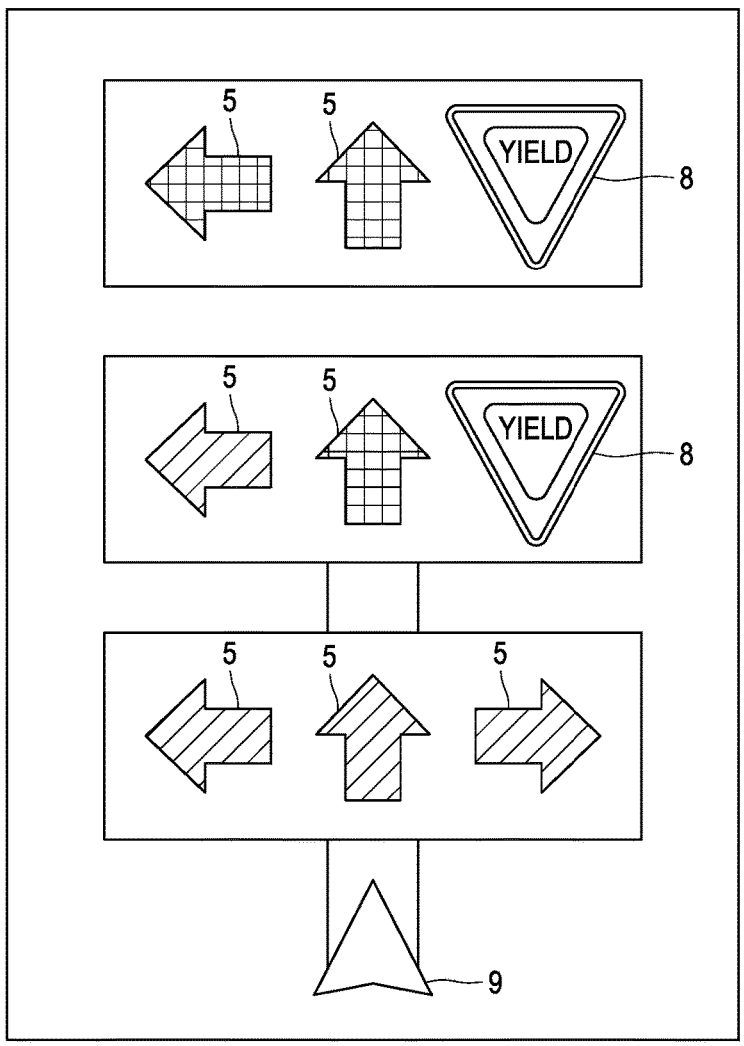
FIG. 4 shows an example display showing visual direction indicators comprising arrows and visual sign indicators comprising a traffic sign icon.
Figure 6:
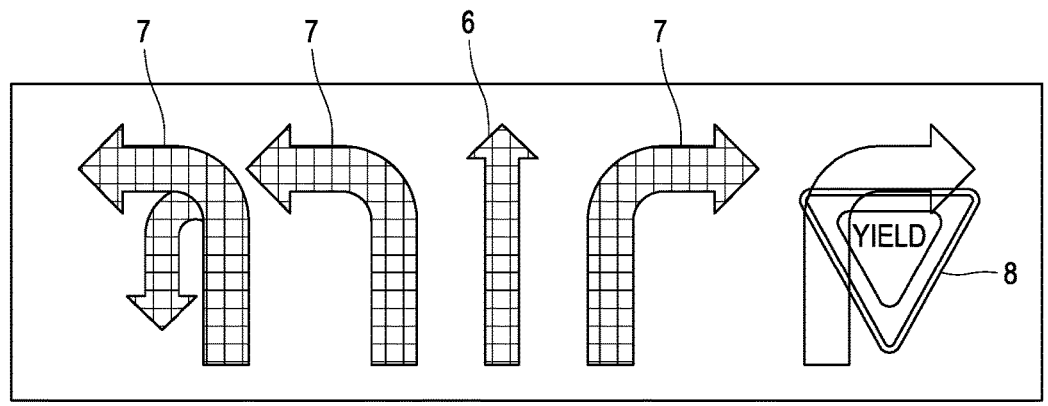
FIG. 6 shows an example display showing visual direction indicators comprising an arrow and visual sign indicators comprising a traffic sign, organized by traffic lanes.

As shown in FIG. 4, each of the visual direction indicators 5 can comprise an arrow indicating the direction of travel, and when travel is allowed, respective arrows associated with the allowed direction are displayed distinguishably from other arrows, thereby indicating the direction or directions in which travel is not allowed. For example, the in-vehicle system 10 can display the respective arrows associated with the allowed directions in a different color from the other arrows, indicating the direction that travel is not allowed, or can flash the respective arrows associated with the allowed direction. A long arrow 6 and/or a long arrow with bent tip 7 may be displayed associated with each traffic lane, and one or more of the long arrows may include multiple bent tips to reflect the assignment of one or more travel directions to each traffic lane stored in the memory device 16, as illustrated in FIG. 6.

Figure 5:
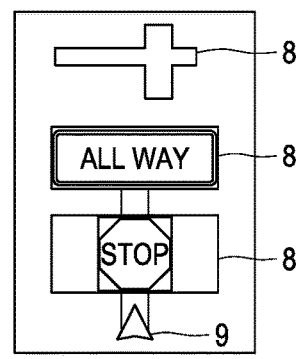
FIG. 5 shows an example display showing visual sign indicators corresponding to traffic signs at a non-signalized intersection.

In some embodiments, the memory device 16 stores non-signalized intersection information, which can include a visual sign indicator 8 to indicate what traffic signs are located at non-signalized intersections. As shown in FIG. 5, the in-vehicle system 10 generates a display of traffic information comprising the visual sign indicator 8 for a non-signalized intersection in a vicinity of the vehicle 1. The visual sign indicator is indicative of traffic signs, such as 'STOP", "YIELD", "NO TURN ON RED", "DO NOT ENTER", and so forth.

The in-vehicle system 10 can include an interface for connection to an on-board camera 19. The traffic-information-collection interface 11 can be configured to receive image data from the on-board camera 19, and the in-vehicle system 10 can process the image data to identify a traffic sign near the vehicle 1 and generate a display of traffic information comprising a visual sign indicator 8 corresponding to the captured traffic sign. The visual sign indicator 8 corresponding to the captured traffic sign can take priority over any non-signalized intersection information stored in the memory device 16, when a conflict exists. Thus, the captured traffic sign can be displayed instead of the visual sign indicator stored in the memory device 16. In some embodiments, the in-vehicle system 10 can process the image data from the on-board camera 19 to identify an arrow traffic signal and generate the display of traffic information comprising the visual direction indicator for a direction that the arrow traffic signal indicates.

Embodiments described hereafter are generally directed to an intersection guidance method using the in-vehicle system 10 comprising the traffic-information-collection interface 11, the vehicle location interface 12, the navigation display interface 14, the memory device 16, and the electronic processor 13.

The vehicle location interface 12 receives a geospatial location of the vehicle 1 from a satellite-linked positioning system, and the in-vehicle system 10 identifies a roadway of vehicle travel correlated using the geospatial location of the vehicle and map information in the memory device 16. The navigation display interface 14 sends vehicle navigation information to a display 15 viewable by the driver to show a vehicle position mark 9 on a display generated from map data including the roadway of vehicle travel.

As the vehicle 1 approaches a signalized intersection, the traffic-information-collection interface 11 receives real-time traffic signal status information 2 for the signalized intersection and for signalized intersections located along the roadway of vehicle travel. The in-vehicle system 10 identifies the signalized intersections by correlating with the map information.

The in-vehicle system 10 processes the real-time traffic signal status information 2 for a traffic signal at each signalized intersection and determines whether travel is permitted, for all directions of travel, from each signalized intersection. The in-vehicle system 10 generates a display of traffic information comprising a visual direction indicator 5 for each direction of travel from each signalized intersection, instead of displaying a simple traffic signal icon as shown in FIG. 2, which only indicates traffic signal color.

The visual direction indicator 5 can comprise an arrow, and each direction of travel can be indicated by the arrow. Arrows associated with directions in which travel is allowed may be displayed in green, and arrows associated with directions in which travel is not allowed may be displayed in red. In some embodiments, the visual direction indicator 5 may be replaced or used with a visual sign indicator 8, which is indicative of traffic signs. For example, if a "NO TURN ON RED" sign is not detected, an arrow indicating a "right turn" may be replaced with a visual sign indicator 8 representing a "YIELD" sign, as shown in FIG. 4. Similarly, when the traffic signal is green, if a "LEFT TURN YIELD ON GREEN" sign is detected, an arrow indicating left turn may be replaced with a visual sign indictor 8 representing a "YIELD" sign. Further, each of the arrows may be displayed associated with traffic lanes, and one or more of the arrows can indicate multiple directions, as shown in FIG. 6.

The in-vehicle system 10 updates the display of traffic information when the traffic-information-collection interface 11 receives changed real-time traffic signal status information 2, such that each of the visual direction indicators provides the driver with an accurate and real-time indication of whether travel is allowed in the direction of travel associated with the visual direction indicator 5.

As shown in FIG. 5, the in-vehicle system 10 can generate a display of traffic information comprising the visual sign indicator 8 for non-signalized intersections in a vicinity of the vehicle 1.

In some embodiments, the traffic-information-collection interface 11 receives the image data obtained by the on-board camera 19 to identify a traffic sign in vicinity of the vehicle 1 and to identify an arrow traffic signal. The in-vehicle system 10 generates a display of traffic information comprising a visual sign indicator 8 corresponding to the traffic sign and the arrow traffic signal.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Language of example or capability used herein, such as, among others, "can," "could," "might," "may," "e.g.," "some," "certain," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown and described features as applied to various example embodiments, omissions, substitutions, additions, and changes in the form and details of the devices or algorithms described can be made without departing from the spirit of the disclosure. Certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. An in-vehicle system capable of communicating traffic information to a driver of a vehicle, the system comprising:
 a traffic-information-collection interface configured to receive real-time traffic signal status information at signalized intersections along a roadway of vehicle travel;
 a vehicle location interface configured to receive a geospatial location of the vehicle from a satellite-linked positioning system;
 a navigation display interface configured to send vehicle navigation information to a display viewable by the driver;
 a memory device storing map information and instructions executable by an electronic processor, wherein the instructions, when executed by the electronic processor, cause the system to:
  identify a roadway of vehicle travel correlated with the geospatial location of the vehicle using the map information;
  identify each signalized intersection along the roadway of vehicle travel;
  process the real-time traffic signal status information for a traffic signal at each signalized intersection;
  determine whether travel is permitted for all directions of travel from each signalized intersection;
  generate a display of traffic information comprising a visual direction indicator for each direction of travel from each signalized intersection, wherein each of the visual direction indicators indicates whether travel is allowed in the direction of travel associated with each visual direction indicator; and
  update the display of traffic information when the traffic-information-collection interface receives changed real-time traffic signal status information, such that each of the visual direction indicators provides the driver with an accurate and real-time indication of whether travel is allowed in the direction of travel associated with the visual direction indicator.

2. The in-vehicle system of claim 1, wherein:
 each of the visual direction indicators comprises an arrow indicating the direction of travel; and
 when it is determined that travel is allowed in an allowed direction, a respective arrow associated with the allowed direction is displayed distinguishably from other arrows indicating a direction or directions in which travel is not allowed.

3. The in-vehicle system of claim 2, wherein each of the arrows is displayed associated with traffic lanes.

4. The in-vehicle system of claim 2, wherein the instructions cause the system to display the respective arrows associated with the allowed directions of travel in a different color from other arrows indicating directions in which travel is not allowed.

5. The in-vehicle system of claim 2, wherein the instructions cause the system to flash the respective arrows associated with the allowed directions of travel.

6. The in-vehicle system of claim 1, wherein:
 the memory device stores non-signalized intersection information which includes a visual sign indicator, and
 the instructions cause the system to generate a display of traffic information comprising the visual sign indicator for non-signalized intersections in a vicinity of the vehicle.

7. The in-vehicle system of claim 6, wherein one or more of the arrows indicate multiple directions.

8. The in-vehicle system of claim 1, further comprising an on-board camera, wherein:
 the traffic-information-collection interface is configured to receive image data from the on-board camera; and
 the instructions cause the system to process the image data to identify a traffic sign in a vicinity of the vehicle and generate a display of traffic information comprising a visual sign indicator corresponding to the traffic sign.

9. The in-vehicle system of claim 8, wherein the instructions cause the system to indicate one or more of the directions of travel with the visual sign indicator or the visual sign indicator with the visual direction indicator.

10. The in-vehicle system of claim 8, wherein the instructions cause the system to process the image data to identify an arrow traffic signal and generate the display of traffic information comprising the visual direction indicator for a direction that the arrow traffic signal indicates.

11. An intersection guiding method using an in-vehicle system comprising a traffic-information-collection interface, a vehicle location interface, a navigation display interface, a memory device, and an electronic processor, the method comprising:
 receiving a geospatial location of the vehicle from a satellite-linked positioning system;
 identifying a roadway of vehicle travel correlated with the geospatial location of the vehicle using map information in the memory device;
 sending vehicle navigation information to a display viewable by a driver of a vehicle;
 receiving real-time traffic signal status information at signalized intersections along a roadway of vehicle travel;
 identifying each signalized intersection along the roadway of vehicle travel;
 processing the real-time traffic signal status information for a traffic signal at each signalized intersection;
 determining whether travel is permitted for all directions of travel from each signalized intersection;
 generating a display of traffic information comprising a visual direction indicator for each direction of travel from each signalized intersection, wherein each of the visual direction indicators indicates whether travel is allowed in the direction of travel associated with each visual direction indicator; and
 updating the display of traffic information when the traffic-information-collection interface receives changed real-time traffic signal status information, such that each of the visual direction indicators provides the driver with an accurate and real-time indication of whether travel is allowed in the direction of travel associated with the visual direction indicator.

12. The method of claim 11, wherein in the generating a display of traffic information step, each of the visual direction indicators comprises an arrow indicating the direction of travel, and when travel is allowed, respective arrows associated with the allowed direction are displayed distinguishably from other arrows indicating the direction that travel is not allowed.

13. The method of claim 12, wherein each of the arrows is associated with a traffic lane of the roadway of vehicle travel.

14. The method of claim 12, wherein each of the arrows associated with the allowed direction are displayed in a different color from the other arrows indicating the direction that travel is not allowed.

15. The method of claim 12, wherein each of the arrows associated with the allowed direction are flashed.

16. The method of claim 11, further comprising generating a display of traffic information comprising a visual sign indicator for non-signalized intersections in vicinity of the vehicle based on non-signalized intersection information stored in the memory device.

17. The method of claim 16, wherein one or more of the arrows indicate multiple directions.

18. An intersection guidance method using an in-vehicle system comprising a traffic-information-collection interface, a vehicle location interface, a navigation display interface, a memory device, an electronic processor, and an on-board camera, the method comprising:
- receiving a geospatial location of the vehicle from a satellite-linked positioning system;
- identifying a roadway of vehicle travel correlated with the geospatial location of the vehicle using map information;
- sending vehicle navigation information to a display viewable by a driver of a vehicle;
- receiving real-time traffic signal status information at signalized intersections along a roadway of vehicle travel and image data from the on-board camera;
- identifying each signalized intersection along the roadway of vehicle travel;
- processing the real-time traffic signal status information for a traffic signal at each signalized intersection and the image data to identify a traffic sign in vicinity of the vehicle;
- determining whether travel is permitted for all directions of travel from each signalized intersection;
- generating a display of traffic information comprising a visual direction indicator and the visual sign indicator for each direction of travel from each signalized intersection, wherein each of the visual direction indicators indicates whether travel is allowed in the direction of travel associated with each visual direction indicator; and
- updating the display of traffic information comprising a visual direction indicator when the traffic-information-collection interface receives changed real-time traffic signal status information, such that each of the visual direction indicators provides the driver with an accurate and real-time indication of whether travel is allowed in the direction of travel associated with the visual direction indicator.

19. The method of claim 18, wherein in the generating a display of traffic information step, one or more of the directions of travel are indicated with the visual sign indicator or the visual sign indicator with the visual direction indicator.

20. The method of claim 18, further comprising:
- processing the image data to identify an arrow traffic signal; and
- generating a display of traffic information comprising the visual direction indicator for a direction that the arrow traffic signal indicates.

* * * * *